(12) United States Patent
Ahn et al.

(10) Patent No.: US 10,597,025 B2
(45) Date of Patent: Mar. 24, 2020

(54) SYSTEM AND METHOD FOR IMPROVING VEHICLE DRIVELINE OPERATION

(71) Applicant: Ford Global Technologies, LLC, Dearborn, MI (US)

(72) Inventors: Kukhyun Ahn, Ann Arbor, MI (US); Mohammad Shakiba-herfeh, Royal Oak, MI (US); David Richens Brigham, Ann Arbor, MI (US); Alexander T. Zaremba, Dearborn Heights, MI (US); Mark John Jennings, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 604 days.

(21) Appl. No.: 15/240,784

(22) Filed: Aug. 18, 2016

(65) Prior Publication Data
US 2018/0050682 A1 Feb. 22, 2018

(51) Int. Cl.
*B60W 20/15* (2016.01)
*B60W 50/00* (2006.01)
(Continued)

(52) U.S. Cl.
CPC ............. *B60W 20/15* (2016.01); *B60K 6/48* (2013.01); *B60W 10/06* (2013.01); *B60W 10/08* (2013.01); *B60W 10/10* (2013.01); *B60W 20/11* (2016.01); *B60W 20/13* (2016.01); *B60W 20/16* (2016.01); *B60W 50/00* (2013.01); *B60W 50/0098* (2013.01); *B60K 2006/4825* (2013.01); *B60W 2050/0013* (2013.01);
(Continued)

(58) Field of Classification Search
CPC ...... B60W 20/15; B60W 20/13; B60W 10/06; B60W 10/08; B60W 10/10; B60W 2050/0013; B60W 2050/0019; B60W 2510/0623; B60W 2510/244; B60W 2710/0666; B50W 50/00; B60Y 2200/92; B60Y 2300/188; Y10S 903/93
USPC ......................................................... 701/22
See application file for complete search history.

(56) References Cited

U.S. PATENT DOCUMENTS

| 6,242,873 B1 | 6/2001 | Drozdz et al. |
| 6,335,610 B1 | 1/2002 | Winstead |

(Continued)

FOREIGN PATENT DOCUMENTS

| CN | 104251726 A | 12/2015 |
| KR | 100551313 B1 | 2/2006 |

OTHER PUBLICATIONS

Murgovski, Nikolce et al., "Automated Engine Calibration of Hybrid Electric Vehicles," Control Systems Technology, IEEE Transactions, 12 pages.

(Continued)

*Primary Examiner* — Anne Marie Antonucci
*Assistant Examiner* — James E Stroud
(74) *Attorney, Agent, or Firm* — David Kelley; McCoy Russell LLP

(57) ABSTRACT

Methods and systems for operating a hybrid driveline that includes an engine and an electric machine are presented. In one non-limiting example, the engine and electric machine are operated according to a solution of a Hamiltonian that includes a first co-state and a second co-state, an engine fuel flow parameter, a rate of change of battery state of charge parameter, and an emissions flow rate parameter.

20 Claims, 4 Drawing Sheets

(51) Int. Cl.
*B60K 6/48* (2007.10)
*B60W 20/16* (2016.01)
*B60W 20/11* (2016.01)
*B60W 20/13* (2016.01)
*B60W 10/06* (2006.01)
*B60W 10/08* (2006.01)
*B60W 10/10* (2012.01)

(52) U.S. Cl.
CPC .............. *B60W 2050/0019* (2013.01); *B60W 2510/0623* (2013.01); *B60W 2510/244* (2013.01); *B60W 2710/0666* (2013.01); *B60Y 2200/92* (2013.01); *B60Y 2300/188* (2013.01); *Y02T 10/6221* (2013.01); *Y02T 10/6252* (2013.01); *Y02T 10/6286* (2013.01); *Y10S 903/93* (2013.01)

(56) References Cited

U.S. PATENT DOCUMENTS

| | | | |
|---|---|---|---|
| 8,611,067 B1* | 12/2013 | Pearson | H01G 4/33 361/305 |
| 9,050,969 B2 | 6/2015 | Yu et al. | |
| 2011/0120128 A1 | 5/2011 | Handagama et al. | |
| 2011/0132290 A1* | 6/2011 | Leone | F02B 43/12 123/3 |
| 2013/0332015 A1* | 12/2013 | Dextreit | B60K 6/448 701/22 |
| 2014/0163789 A1* | 6/2014 | Yu | B60W 10/06 701/22 |
| 2015/0324516 A1 | 11/2015 | Peng et al. | |
| 2017/0327105 A1* | 11/2017 | Shakiba-Herfeh | F16H 61/0204 |

OTHER PUBLICATIONS

Kheir, Naim A., et al., "Emissions and Fuel Economy Trade-Off for Hybrid Vehicles Using Fuzzy Logic," Mathematics and Computers in Simulation, vol. 66, Jan. 7, 2004, pp. 155-172, 20 pages.

Ao, G.Q., et al., "Fuel Economy and NOx Emission Potential Investigation and Trade-off of a Hybrid Electric Vehicle Based on Dynamic Programming," Proceedings of the Institution of Mechanical Engineers, Part D: Journal of Automobile Engineering, vol. 222, Jun. 3, 2008, pp. 1851-1864, 15 pages.

Kum, Dongsuk et al., "Supervisory Control of Parallel Hybrid Electric Vehicles for Fuel and Emission Reduction," Journal of Dynamic Systems, Measurement, and Control, vol. 133, Nov. 2011, pp. 1-10, 10 pages.

Johnson, Valerie H., et al., "HEV Control Strategy for Real-Time Optimization of Fuel Economy and Emissions," SAE Technical Paper, 2000-01-1543, 15 pages.

Hu, Xiaolin, et al., "Multi-Objective Optimization of HEV Fuel Economy and Emissions using Evolutionary Computation," SAE Technical Paper, 2004-01-1153, 10 pages.

* cited by examiner

SYSTEM AND METHOD FOR IMPROVING VEHICLE DRIVELINE OPERATION

BACKGROUND/SUMMARY

A driveline of a hybrid vehicle may include an engine and an electrical machine to provide torque to propel the hybrid vehicle. The engine may include a plurality of actuators by which the engine may be controlled to improve engine fuel economy, performance, and emissions. However, adjusting one engine actuator may improve one engine output (e.g., power) while it may degrade another engine output (e.g., emissions). Further, the electric machine may provide a share or portion of power demanded by the hybrid vehicle's driver so that the engine may operate in a more efficient operating region. Nevertheless, the electric machine may not be available at all times and it may not have capacity to provide large amounts of power. Engine and motor power may be directed to a torque converter, transmission or gearbox, differential, and other driveline components to deliver the requested power to vehicle wheels. The various driveline components may be operated in many different states to direct engine and electric machine torque to vehicle wheels. Thus, for each driveline component that includes more than one operating state, the complexity of controlling driveline performance, efficiency, and fuel economy increases.

The inventors herein have recognized the above-mentioned issues and have developed a method for operating a driveline, comprising: operating a hybrid driveline via a controller adjusting one or more actuators based on a solution of a Hamiltonian, the Hamiltonian including a first co-state and a second co-state, an engine fuel flow parameter, a rate of change of battery state of charge parameter, and an emissions flow rate parameter.

By operating a hybrid vehicle driveline according to a Hamiltonian that includes co-states for rate of change of battery state of charge and engine emissions, it may be possible to provide the technical result of improving vehicle performance while reducing vehicle emissions. The Hamiltonian may be solved for a plurality of vehicle operating conditions so that vehicle operation may provide fuel efficiency and lower vehicle emissions.

The present description may provide several advantages. Specifically, the approach may improve vehicle performance, fuel economy, and emissions. In addition, the approach may an evaluate driveline performance over a wide range of driveline operating conditions to provide a desired wheel torque and wheel speed. Further, the approach provides an efficient way to determine desired co-state values.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
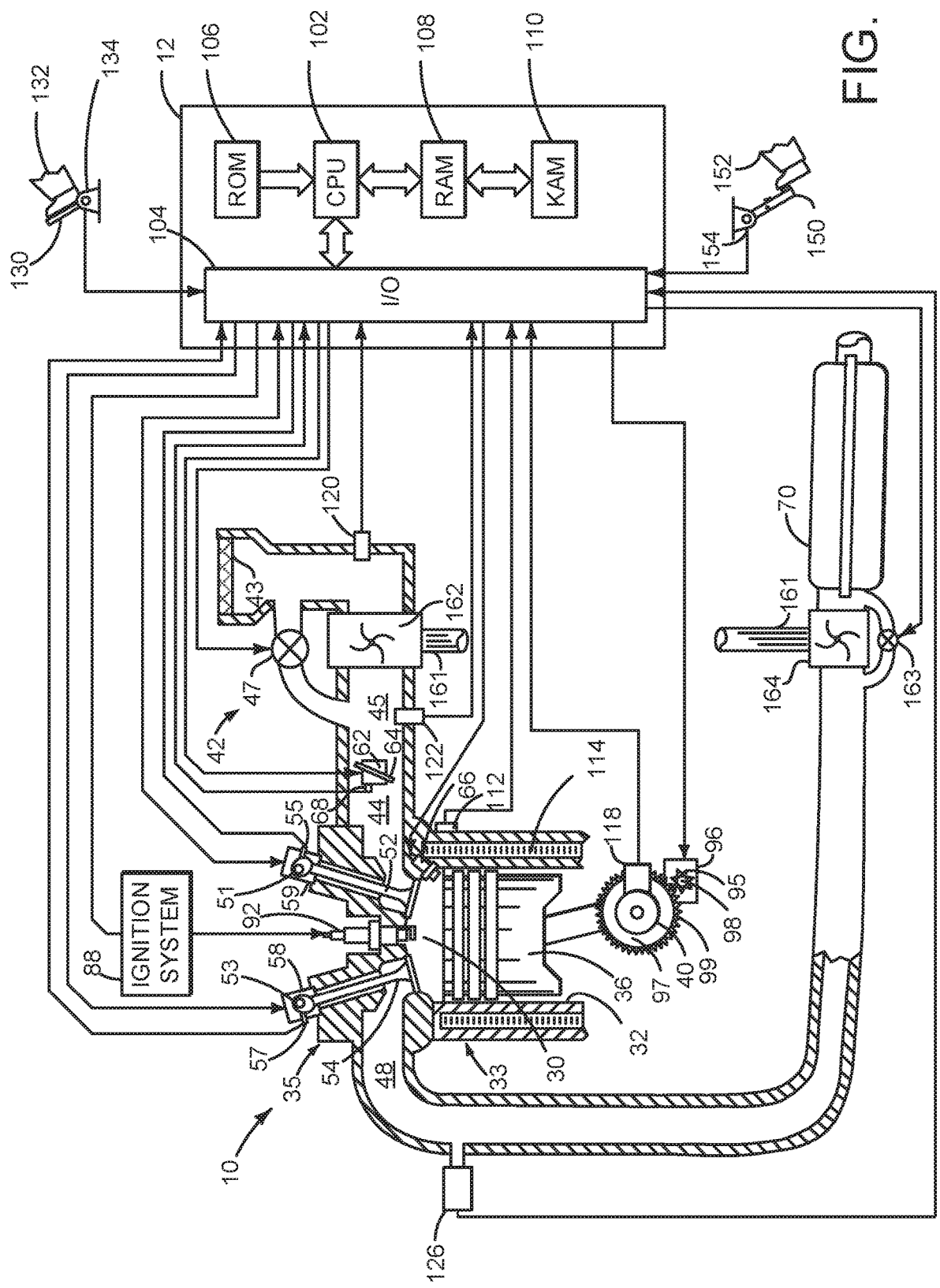
FIG. 1 shows a schematic depiction of an engine.
Figure 2:
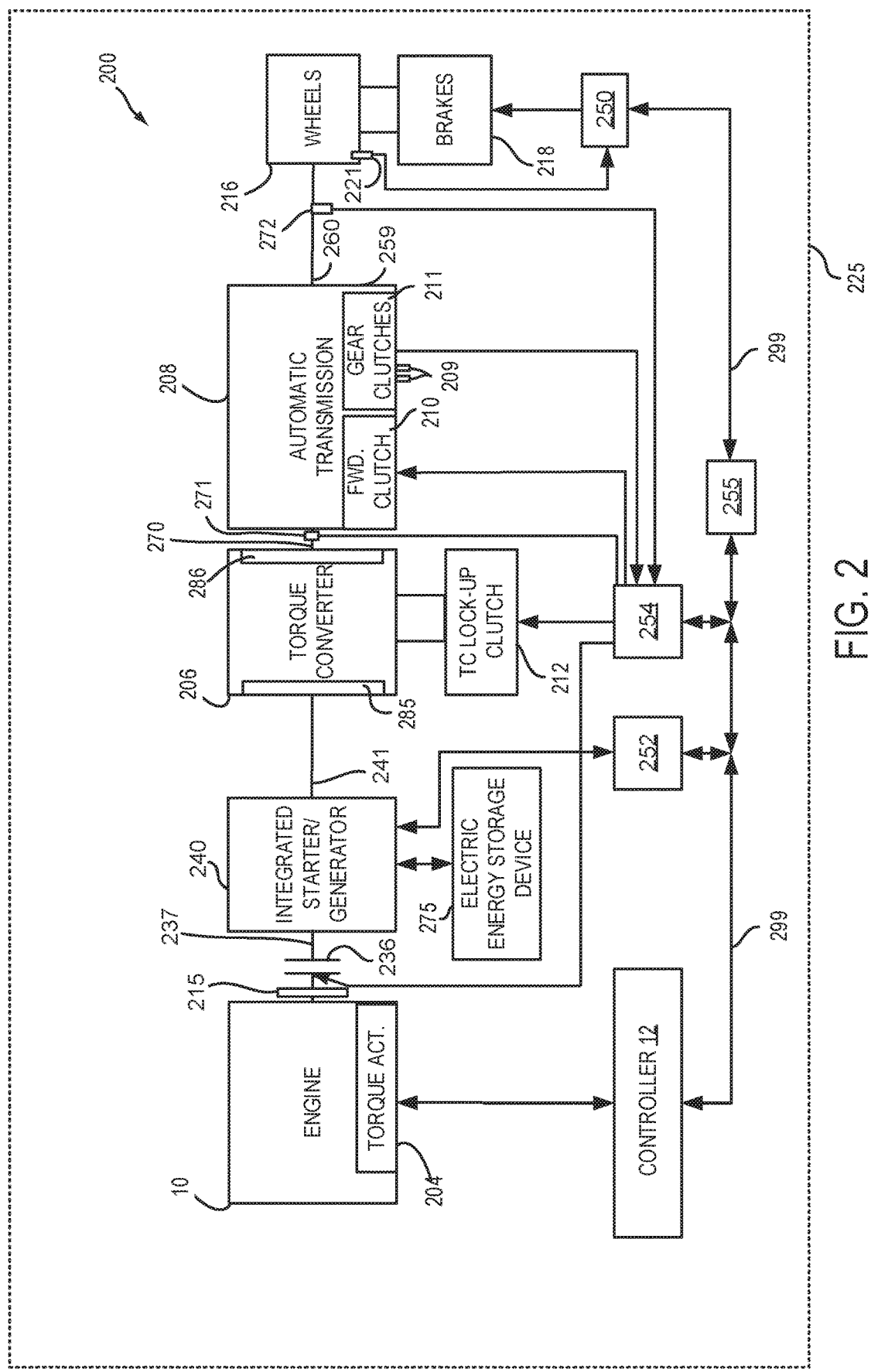
FIG. 2 shows a schematic depiction of an example vehicle powertrain including an engine.
Figure 3:
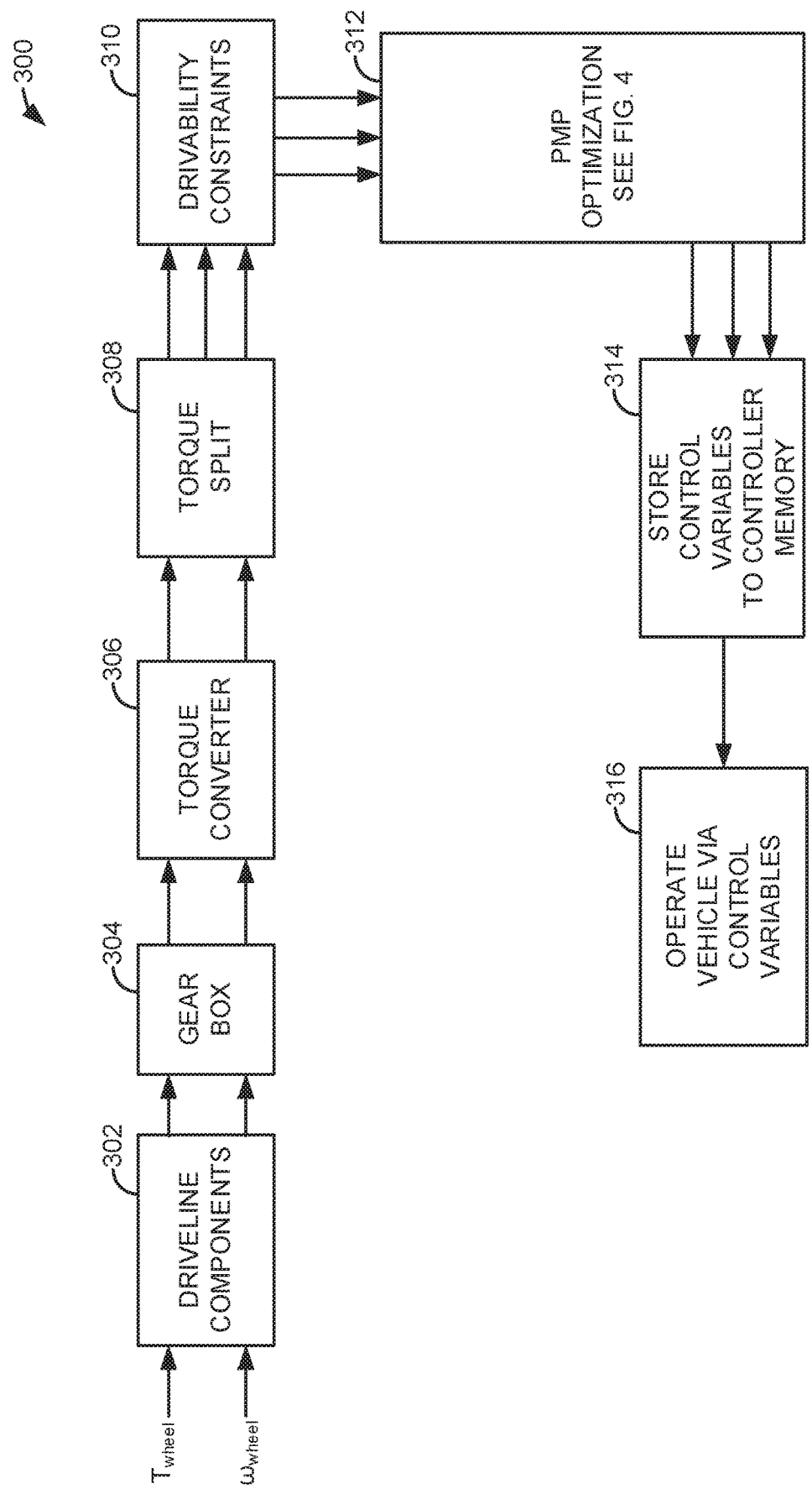
FIG. 3 shows a block diagram of driveline control parameter optimization for a hybrid vehicle according to Pontryagin's minimization principal (PMP) and operating a driveline based on a minimized Hamiltonian.
Figure 4:
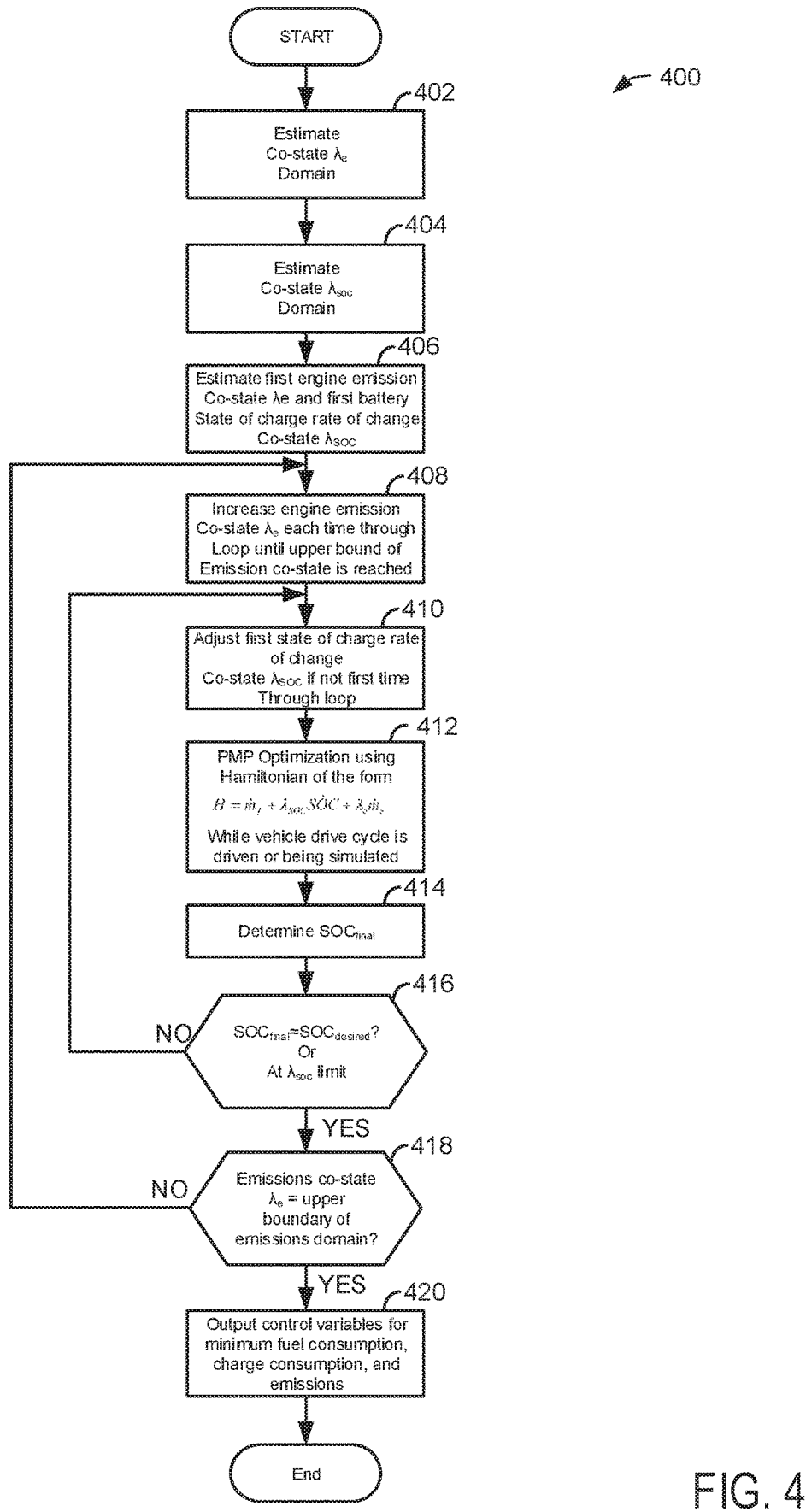
FIG. 4 shows an example method for determining co-states of a Hamiltonian and determining control actions that minimize the Hamiltonian.

The present description is related to operating a hybrid driveline based on optimization according to Pontryagin's minimization principal (PMP). The hybrid powertrain may include an engine as shown in FIG. 1. The engine of FIG. 1 may be incorporated into a vehicle powertrain as shown in FIG. 2. FIG. 3 shows a block diagram showing inputs and outputs to a PMP optimization process. FIG. 4 shows a flow chart of a way to determine co-states for PMP optimization.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to as a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver's foot 132; a position sensor 154 coupled to brake pedal 150 for sensing force applied by driver's foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline or powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of powertrain disconnect clutch 236 through dual mass flywheel 215. Disconnect clutch 236 may be electrically or hydraulically actuated. The downstream side of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a vehicle system, comprising: an engine; an electric machine; a transmission including a torque converter; and a controller including executable instructions stored in non-transitory memory to adjust a state of an actuator in response to a solution of a Hamiltonian that includes a first co-state and a second co-state, an engine fuel flow parameter, a rate of change of battery state of charge parameter, and an emissions flow rate parameter. The vehicle system includes where the actuator a throttle of the engine. The vehicle system includes where the actuator is a transmission gear actuator. The vehicle system includes where the actuator is an electric machine controller. The vehicle system further comprises additional instructions to select the solution from a plurality of solutions to the Hamiltonian. The vehicle system includes where the plurality of solutions to the Hamiltonian are based on a plurality of values of the first co-state and the second co-state.

It should be noted that the methods described herein are not limited to the system of FIG. 2. Rather, the methods may be applied to drivelines configured in parallel or serial configurations including power-split configurations. Further, the methods may be applied to drivelines that include multiple electric machines. Further still, the methods described herein are also applicable to dual clutch transmissions and continuously variable transmissions.

Referring now to FIG. 3, a block diagram of driveline control parameter optimization according to PMP is shown. The block diagram may be implemented as executable instructions stored in non-transitory memory of controller 12 in the system of FIGS. 1 and 2. Further, at least portions of the block diagram may be actions taken within the physical world to transform states of driveline actuators.

Actual or desired vehicle wheel torque and vehicle wheel speed are input to block 302. Simulation data may be input to block 302 where the simulation vehicle data is based on a desired vehicle speed and a desired wheel torque. Alternatively, actual requested vehicle wheel torque and actual wheel speed may be determined via an accelerator pedal position and a wheel speed sensors. The wheel torque and wheel speed are converted to a transmission output torque and a transmission output speed by multiplying the wheel torque and wheel speed by gear ratios in the driveline (e.g., an axle ratio). Further, the transmission output torque and speed may also include compensation for driveline losses. The transmission output torque and transmission output speed are input to block 304.

At block 304, the transmission output torque is converted into a transmission input torque row vector with N elements that provides the transmission output torque, where N is the actual total number of transmission gears. Each of the N elements represents an input transmission torque that provides in the transmission output torque for a different gear. For example, element 1 of the row vector represents transmission input torque that provides the transmission output torque when the transmission is engaged in first gear. Element three of the row vector represents transmission input torque that provides the transmission output torque when the transmission is engaged in third gear. The values in the row vector may be determined by multiplying the transmission output torque by gear ratios in the transmission plus factors for transmission losses.

The transmission output speed is converted into a transmission input speed row vector with N elements that provides the transmission output speed, where N is the actual total number of transmission gears. Each of the N elements represents an input transmission speed that provides the transmission output speed for a different gear. For example, element 1 of the row vector represents transmission input speed that provides the transmission output speed when the transmission is engage in first gear. Element three of the row vector represents transmission input speed that provides the transmission output speed when the transmission is engaged in third gear. The values in the row vector may be determined by multiplying the transmission output speed by gear ratios in the transmission plus factors for transmission losses. The transmission input torque and speed row vector are input to block 306.

At 306, the transmission input speed row vector is a basis for providing a torque converter input speed vector. The torque converter input speed vector includes two torque converter input speed rows for each transmission input speed in the transmission input speed row vector. Thus, the number of columns in the transmission input speed row vector is doubled to provide the torque converter input row vector. The transmission input speed values in the transmission input speed row vector are modified to account for the two operating states of the torque converter clutch. For each speed value in the transmission input speed row vector, there is a corresponding torque converter input speed for a locked torque converter clutch and a torque converter input speed for an unlocked torque converter clutch in the torque converter input speed vector. The columns in the torque converter input speed vector correspond to particular transmission gears and torque converter states that result in the values in the torque converter input speed vector. For example, a first column in the torque converter input speed vector may be a torque converter input speed when the transmission is engaged in first gear and the torque converter clutch is open. An eight column in the torque converter input speed vector may be a torque converter input speed when the transmission is engaged in third gear and the torque converter is locked.

Similarly, the transmission input torque row vector is a basis for providing a torque converter input torque vector. The torque converter input torque vector includes two torque convert input torque values for each transmission input torque in the transmission input torque row vector. Thus, the number of columns in the transmission input torque row vector is doubled to provide the torque converter input torque row vector. The transmission input torque values in the transmission input speed row vector are modified to account for the two operating states of the torque converter clutch. For each torque in the transmission input torque row vector, there is a corresponding torque converter input torque for a locked torque converter clutch and a torque converter input torque for an unlocked torque converter clutch in the torque converter input torque vector. The columns in the torque converter input torque vector correspond to particular transmission gears and torque converter states that result in the values in the torque converter input torque vector. For example, a first column in the torque converter input torque vector may be a torque converter input torque when the transmission is engaged in first gear and the torque converter clutch is open. An eight column in the torque converter input torque vector may be a torque converter input torque when the transmission is engaged in third gear and the torque converter is locked. For values that described a locked torque converter, the torque converter input torque matches the transmission input torque with small modification for torque converter clutch losses. If the torque converter clutch is open, the torque converter input torque is determined based on the torque converter's capacity factor, transmission input speed, and transmission input torque. The torque converter input torque row vector and the torque converter input speed row vector are input to block 308.

At block 308, the torque converter input torque row vector and the torque converter input speed vector are the basis for providing a torque source row vector that includes entries for engine torque, engine speed, electric machine torque, and electric machine speed based on entries in the torque converter input torque row vector and torque converter input speed vector. The engine torque, engine speed, electric machine torque, and electric machine speed values in the torque source row vector are based on different torque split values (e.g., fraction of requested wheel torque provided by the engine and fraction of the requested wheel torque provided by the electric machine) for the present torque converter input speeds and torque converter input torques. For example, if an entry in the torque converter input torque row vector requires 100 N-m of torque to go with a torque converter input speed row vector entry of 2000 RPM, entries in the torque source vector may specify 80 N-m of engine torque at 2000 RPM and 20 N-m of electric machine torque at 2000 RPM. Of course, the size of the torque source vector may increase for each unique torque split requested between the engine and the electric machine. The columns in the torque source row vector correspond to particular transmission gears and torque converter states that result in the values in the torque converter input speed vector. For example, a first column in the torque source vector may be a torque converter input speed when the transmission is engaged in first gear and the torque converter clutch is open. An eight column in the torque source row vector may be a torque converter input speed when the transmission is engaged in third gear and the torque converter is locked.

A torque source state row vector is determined from the engine speed, engine torque, electric machine speed, and electric machine torque in the torque source row vector. The torque source state row vector describes operating states of the torque sources that provide the speeds and torques in the torque source vector. In particular, engine fuel flow rate, engine emissions, and rate of change in state of charge for the battery are elements of the torque source state row vector and the torque source state row vector includes entries corresponding to entries in the torque source row vector. The engine fuel flow rate values may be determined from a model or empirically determined data stored in a table or function that is indexed by engine torque and engine speed. Likewise, engine emissions flow rates for NOx, CO, $CO_2$, and hydrocarbons may be determined from a model or empirically determined data stored in a table or function that is indexed by engine torque and engine speed. Rate of change in battery charge may be determined based on a model of current consumption by the electric machine when the electric machine provides the torque in the torque source row vector. The columns in the torque source state row vector correspond to particular transmission gears and torque converter clutch states that result in the values in the torque converter input speed vector. For example, a first column in the torque source state vector may be a torque converter input speed when the transmission is engaged in first gear and the torque converter clutch is open. An eight column in the torque source state row vector may be a torque converter input speed when the transmission is engaged in third gear and the torque converter is locked. The torque source state row vector is input to block 310.

At block 310, columns of the torque source state row vector that correspond to vehicle conditions that provide poor drivability are removed or alternatively values in the columns may be replace by predetermined values (e.g., 1,000,000). The drivability considerations may include but are not limited to skip shifting (e.g., shifting from $1^{st}$ gear to $4^{th}$ gear), shift/clutch engagement busyness (hunting), motor reserve torque for engine pull-up, transient motion of rotational inertias, and engine pull up and down busyness. The torque source state row vector is then input to block 312.

At block 312, Pontryagin's minimization principal is applied. The minimization includes a Hamiltonian of the form: $H=\dot{m}_f+\lambda_{SOC}\dot{SOC}+\lambda_e\dot{m}_e$ where $\dot{m}_f$ is fuel flow rate to the engine, $\lambda_{SOC}$ is a co-state for rate of change in battery state of charge, $\dot{SOC}$ is the rate of change in battery state of charge, $\lambda_e$ is a co-state for the engine emission flow rate, and $\dot{m}_e$ is the flow rate of exhaust from the engine. The Hamiltonian is minimized to determine which transmission gear, torque converter clutch state, engine torque, engine speed, electric machine torque, and electric machine speed that provides most desirable operating conditions for reduced fuel consumption by the engine, reduced battery state of charge reduction, and reduced engine emissions. Finding the minimum member of the Hamiltonian vector provides the optimal control decision at the present instant of the wheel torques and wheel speeds.

The co-state for emissions flow rate and the co-state for rate of change of battery state of charge represent rates of change in the quantity being optimized (e.g., battery state of charge rate of change and engine emissions rate of change) as a function of a constraint parameter. They may also be described as Lagrange multipliers. The co-states may be initially estimated by a development engineer as discussed in further detail in the description of FIG. 4.

Values in the torque source state row vector are input to the Hamiltonian along with the co-state values and the Hamiltonian is solved for each value in the torque source state row vector, which corresponds to a particular transmission gear, torque converter clutch state, and torque sources providing the driveline torque. For example, if the engine is stopped, fuel flow is zero, engine emissions are zero, the emissions co-state is 5, the rate of change in battery state of charge is −0.003, and the battery state of charge rate of change is −1, at one condition for the torque source state row vector, the solution for the Hamiltonian is then given by: H=$\dot{m}_f$+$\lambda_{SOC}$SŎC+$\lambda_e \dot{m}_e$0+(−1)·(−0.003)+5·0=0.003. The solution to the minimized Hamiltonian, its corresponding engine fuel flow rate, its corresponding rate of change in battery state of charge, and its corresponding engine emissions flow rate are passed to 314. Further, the co-state values for the Hamiltonian are also passed to 314.

At block 314, the PMP, or Hamiltonian minimum solution and its corresponding engine fuel flow rate, rate of change in battery state of charge, and engine emissions flow rate are stored to memory with the transmission gear, torque converter clutch state, and torque source split ratio (e.g., 30% electric machine torque and 70% engine torque) requirement that provide the minimum Hamiltonian solution. Further, the co-state values for the Hamiltonian may also be stored to memory. The transmission gear, torque converter clutch state, and battery state of charge rate of change are passed to block 315.

At block 315, the hybrid powertrain or driveline operates the engine, electric machine, transmission, and torque converter clutch at optimized conditions based on driving conditions (e.g., requested wheel torque and present wheel speed) according to the engine fuel flow rate, rate of change in battery state of charge, and engine emissions where the Hamiltonian was minimized. For example, if the engine speed and electric machine speed were 2000 RPM for the vehicle's present speed and requested torque, a transmission gear is selected that adjusts engine and electric machine speed to 2000 RPM. Further, engine torque is adjusted via adjusting a throttle opening amount, fuel injection amount, and spark timing. Electric machine torque is adjusted such that the electric machine consumes charge from the battery at the rate of change in battery charge corresponding to a value of rate of change in battery charge where the Hamiltonian was minimized.

Referring now to FIG. 4, an example method for determining co-states of a Hamiltonian and determining control actions that minimize the Hamiltonian is shown. The method of FIG. 4 may be applied to the powertrain shown in FIGS. 1 and 2. Further, at least portions of the method of FIG. 4 may be included as executable instructions in the system of FIGS. 1 and 2. And, at least portions of the method of FIG. 4 may be actions taken within the physical world to transform states of engine actuators and other engine and transmission components.

At 402, method 400 estimates of engine emissions co-state $\lambda_e$ domain. The domain of $\lambda_e$ may be a range of values (e.g., 5 to 10) of real numbers. The estimate may be provided by a development engineer (e.g., an estimate based on intuition or experience), or it may be based on the relationship between elements in the Hamiltonian, or it may be a range determined by a controller. Method 400 proceeds to 402 after the domain of co-state $\lambda_e$ is determined.

At 404, method 400 estimates of battery state of charge rate of change co-state $\lambda_{SOC}$ domain. The domain of $\lambda_{SOC}$ may be a range of values (e.g., −0.01 to −1) of real numbers. The estimate may be provided by a development engineer (e.g., an estimate based on intuition or experience), or it may be based on the relationship between elements in the Hamiltonian, or it may be a range determined by a controller. Method 400 proceeds to 406 after the domain of co-state $\lambda_{SOC}$ is determined.

At 406, method 400 estimates an initial value of the engine emissions co-state $\lambda_e$. The initial value of $\lambda_e$ is selected to be within the domain of $\lambda_e$. In one example, a first extent of the $\lambda_e$ domain is selected as the initial value of $\lambda_e$ so that the value of $\lambda_e$ may be incremented until a second extent of the $\lambda_e$ domain is reached by $\lambda_e$. For example, if the domain of $\lambda_e$ is from 1 to 10, an initial value of $\lambda_e$ is 1 so that the value of $\lambda_e$ can be incremented until $\lambda_e$=10.

Method 400 also estimates an initial value of the battery state of charge rate of change co-state $\lambda_{SOC}$. The initial value of $\lambda_{SOC}$ is selected to be within the domain of $\lambda_{SOC}$. In one example, a first extent of the $\lambda_{SOC}$ domain is selected as the initial value of $\lambda_{SOC}$ so that the value of $\lambda_{SOC}$ may be decremented until a second extent of the $\lambda_{SOC}$ domain is reached by $\lambda_{SOC}$. For example, if the domain of $\lambda_{SOC}$ is from −0.01 to −1, an initial value of $\lambda_{SOC}$ is −0.01 so that the value of $\lambda_{SOC}$ can be decremented until $\lambda_{SOC}$=−1. Method 400 proceeds to 408 after the initial values of $\lambda_e$ and $\lambda_{COS}$ are determined.

At 408, method 400 increments the value of $\lambda_e$ each time method 400 returns to 408 from 418. The amount that $\lambda_e$ is incremented may be a fixed predetermined value. The value of $\lambda_e$ is not incremented the first time method 400 reaches 408 from 406. The value of $\lambda_e$ is incremented so that discrete values of $\lambda_e$ may be used to determine the minimized Hamiltonian over the $\lambda_e$ domain. Further, the value of $\lambda_{SOC}$ is set to its initial value (e.g., the minimum extent value of the $\lambda_{SOC}$ domain) if method 400 is returning to 408 from 418 so that the Hamiltonian may be evaluated over the $\lambda_{SOC}$ domain for each value of $\lambda_e$. Method 400 proceeds to 410 after the incrementing (e.g., increasing) the value of $\lambda_e$ if method 400 is not passing through 408 from 406.

At 410, method 400 increments the value of $\lambda_{SOC}$ each time method 400 returns to 410 from 416. The amount that $\lambda_{SOC}$ is incremented may be a fixed predetermined value. The value of $\lambda_{SOC}$ is not incremented each time method 400 reaches 410 from 408. The value of $\lambda_{SOC}$ is incremented so that discrete values of $\lambda_{SOC}$ may be used to determine the minimized Hamiltonian over the $\lambda_{SOC}$ domain.

Alternatively, subsequent $\lambda_{SOC}$ co-state values may be determined based on Newton's method. In particular, after a simulation or drive cycle, a function that defines a relationship between the initial trial $\lambda_{SOC}$ and the final battery state of charge (SOC) may be expressed as:

$$f(\lambda_{SOC}) = SOC_{final}(\lambda_{SOC}) - SOC_{desired}$$

where $SOC_{final}$ is the final value of SOC after the simulation or drive cycle, $SOC_{desired}$ is the desired final value of SOC after the simulation or drive cycle. Solving by Newton's method yields:

$$\lambda_{SOC,n+1} = \lambda_{SOC,n} - \frac{f(\lambda_{SOC,n})}{f'(\lambda_{SOC,n})}$$

where n is the number of the $\lambda_{SOC}$ co-state estimate or guess, and f' is the first derivative of function f, which may be numerically implemented as:

$$\lambda_{SOC,n+2} = \lambda_{SOC,n+1} - f(\lambda_{SOC,n+1}) \frac{\lambda_{SOC,n+1} - \lambda_{SOC,n}}{f(\lambda_{SOC,n+1}) - f(\lambda_{SOC,n})}$$

where $\lambda_{SOC,n+2}$ is the nth plus two estimate of the $\lambda_{SOC}$ co-state. In this way, the $\lambda_{SOC}$ co-state root may be arrived at sooner than if the $\lambda_{SOC}$ co-state were simply decremented. Method 400 proceeds to 412 after incrementing or adjusting (e.g., increasing) the value of $\lambda_{SOC}$ if method 400 is not passing through 410 from 408.

At 412, method 400 applies PMP optimization as described at 312 of FIG. 3 to determine the minimum value of the Hamiltonian H=$\dot{m}_f$+$\lambda_{SOC}$SÖC+$\lambda_e\dot{m}_e$. The Hamiltonian is evaluated for each value of $\lambda_{SOC}$ and each value of $\lambda_e$ for each condition in the torque source state row vector as described in FIG. 3. The values of $\dot{m}_f$, SÖC, and $\dot{m}_e$ may be based on wheel torque and wheel speed of a simulation or vehicle conditions when the hybrid vehicle is being driven on a road. Method 400 proceeds to 414 after the Hamiltonian is minimized for the present $\lambda_{SOC}$ and $\lambda_e$.

At 414, method 400 determines the final battery state of charge value for the vehicle conditions that minimize the Hamiltonian. For example, if the initial battery state of charge before entering step 412 is 90 and the rate of change in battery state of charge reduces battery state of charge by 10 over the simulation or driving cycle, the SOC final is 80. The rate of change in battery state of charge is based on the $\lambda_{SOC}$ and $\lambda_e$ values that minimize the Hamiltonian. Method 400 proceeds to 416.

At 416, method 400 judges if the final battery state of charge determined at 414 is approximately equal (e.g., within ±3%) to a desired battery state of charge or if the value of $\lambda_{SOC}$ is equal to or less than a threshold, where the threshold is an extent of the $\lambda_{SOC}$ domain (e.g., −1 for the domain of $\lambda_{SOC}$ described above). The desired battery state of charge may be a predetermined value. If method 400 judges that the final battery state of charge is approximately equal to the desired battery state of charge, the answer is yes and method 400 proceeds to 418. Otherwise, the answer is no and method 400 returns to 410.

At 418, method 400 judges if the value of $\lambda_e$ is equal to or greater than a threshold, where the threshold is an extent of the $\lambda_e$ domain (e.g., 10 for the $\lambda_e$ domain described above). If method 400 judges that the value of $\lambda_e$ is greater than the threshold, the answer is yes and method 400 proceeds to 420. Otherwise, the answer is no and method 400 returns to 408.

At 420, method 400 outputs the solution to the minimized Hamiltonian, its corresponding engine fuel flow rate, its corresponding rate of change in battery state of charge, and its corresponding engine emissions flow rate. The engine fuel flow rate, rate of change in battery state of charge, and engine emissions flow rate are stored to controller memory with the transmission gear, torque converter clutch state, and torque source split ratio (e.g., 30% electric machine torque and 70% engine torque) requirement. The hybrid powertrain or driveline operates the engine, electric machine, transmission, and torque converter clutch at optimized conditions based on driving conditions (e.g., requested wheel torque and present wheel speed) according to the engine fuel flow rate, rate of change in battery state of charge, and engine emissions where the Hamiltonian was minimized. Method 400 proceeds to exit.

In this way, the Hamiltonian may be evaluated according to a plurality of $\lambda_e$ co-states and $\lambda_{SOC}$ co-states. The $\lambda_e$ co-state may be incrementally increased from a first value to a last value to evaluate the Hamiltonian over a domain of the $\lambda_e$ co-state so that a least value solution of the Hamiltonian may be determined and used as a basis for controlling the hybrid driveline engine, transmission, and electric machine. Likewise, the $\lambda_{SOC}$ co-state may be incrementally increased from a first value to a last value to evaluate the Hamiltonian over a domain of the $\lambda_{SOC}$ co-state so that a least value solution of the Hamiltonian may be determined and used as a basis for controlling the hybrid driveline engine, transmission, and electric machine.

Thus, the methods of FIGS. 3 and 4 provide for a method for operating a driveline, comprising: operating a hybrid driveline via a controller adjusting one or more actuators based on a solution of a Hamiltonian, the Hamiltonian including a first co-state and a second co-state, an engine fuel flow parameter, a rate of change of battery state of charge parameter, and an emissions flow rate parameter. The method includes where the first co-state is a battery rate of change of battery state of charge co-state. The method includes where the second co-state is an engine emissions flow rate co-state. The method further comprises solving the Hamiltonian based on vehicle data or data from a simulation. The method includes where the solution of the Hamiltonian is a value less than a threshold. The method further comprises storing driveline control parameters to memory based on the solution of the Hamiltonian. The method includes where the actuator adjusts engine torque.

Additionally, the methods of FIGS. 3 and 4 provide for a method for operating a driveline, comprising: estimating first and second co-states of a Hamiltonian vector, the Hamiltonian vector including a fuel flow parameter, a rate of change of battery state of charge parameter, and an emissions flow rate parameter; increasing a value of the first co-state incrementally while holding the second co-state constant until a boundary of a domain of the first co-state is reached; selecting a solution to the Hamiltonian from a plurality of solutions to the Hamiltonian; storing a fuel flow rate, a rate of change of battery state of charge, and an emissions flow rate to memory of a controller based on the solution; and adjusting an actuator of a driveline via the controller responsive to the stored fuel flow rate.

In some examples, the method further comprises adjusting the actuator of the driveline via the controller responsive to the emissions flow rate. The method further comprises adjusting the actuator of the driveline via the controller responsive to the rate of change of battery state of charge. The method includes where the first and second co-states are estimated via the controller. The method further comprises incrementing the second co-state in response to a value of the second co-state being less than a threshold. The method includes where the first co-state is incremented in response to a value of the first co-state being less than a threshold. The method further comprises estimating a domain of the first co-state and a domain of the second co-state.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating a driveline, comprising:
    operating a hybrid driveline via a controller adjusting one or more actuators based on a solution of a Hamiltonian, the Hamiltonian including a first co-state related to a rate of change of battery state of charge and a second co-state related to an emissions flow rate, an engine fuel flow parameter, a rate of change of battery state of charge parameter, and an emissions flow rate parameter, a solution to the Hamiltonian generated by increasing a value of the second co-state incrementally while holding the first co-state constant until a boundary of a domain of the second co-state is reached; and then, adjusting the first co-state to generate the solution to the Hamiltonian.

2. The method of claim 1, where the first co-state is a multiplier of the rate of change of battery state of charge parameter.

3. The method of claim 1, where the second co-state is a multiplier of the emissions flow rate parameter.

4. The method of claim 1, further comprising solving the Hamiltonian based on vehicle data or data from a simulation.

5. The method of claim 1, where the solution of the Hamiltonian is a value less than a threshold.

6. The method of claim 1, further comprising storing driveline control parameters to memory based on the solution of the Hamiltonian.

7. The method of claim 1, where the one or more actuators adjust engine torque.

8. A method for operating a driveline, comprising:
    determining co-states of a Hamiltonian vector, the Hamiltonian vector including a fuel flow parameter, a rate of change of battery state of charge parameter, and an emissions flow rate parameter; including:
        estimating first and second co-states of the Hamiltonian vector including a rate of change of battery state of charge as the first co-state and an emissions flow rate as the second co-state;
        increasing a value of the second co-state incrementally while holding the first co-state constant until a boundary of a domain of the second co-state is reached, and then adjusting the first co-state; and
        selecting a solution to the Hamiltonian vector from a plurality of solutions to the Hamiltonian vector;
        storing a fuel flow rate, a rate of change of battery state of charge, and an emissions flow rate to memory of a controller based on the solution; and
        adjusting an actuator of a driveline via the controller responsive to the stored fuel flow rate.

9. The method of claim 8, where the first co-state is a multiplier of the rate of change of battery state of charge and the second co-state is a multiplier of the emissions flow rate, and further comprising:
    adjusting the actuator of the driveline via the controller responsive to the emissions flow rate.

10. The method of claim 8, further comprising adjusting the actuator of the driveline via the controller responsive to the rate of change of battery state of charge.

11. The method of claim 8, where the first and second co-states are estimated via the controller.

12. The method of claim 8, further comprising incrementing the second co-state in response to a value of the second co-state being less than a threshold.

13. The method of claim 8, where the first co-state is incremented in response to a value of the first co-state being less than a threshold.

14. The method of claim 8, further comprising estimating the domain of the first co-state and the domain of the second co-state.

15. A vehicle system, comprising:
    an engine;
    an electric machine;
    a transmission including a torque converter; and
    a controller including executable instructions stored in non-transitory memory to adjust a state of an actuator in response to a solution of a Hamiltonian that includes a first co-state related to a rate of change of battery state of charge and a second co-state related to an emissions flow rate, an engine fuel flow parameter, a rate of change of battery state of charge parameter, and an emissions flow rate parameter, a solution to the Hamiltonian generated by increasing a value of the second co-state incrementally while holding the first co-state constant until a boundary of a domain of the second co-state is reached; and then, adjusting the first co-state to generate the solution to the Hamiltonian.

16. The vehicle system of claim 15, where the actuator is a throttle of the engine, where the first co-state is a multiplier of the rate of change of battery state of charge parameter, and where the second co-state is a multiplier of the emissions flow rate parameter.

17. The vehicle system of claim 15, where the actuator is a transmission gear actuator.

18. The vehicle system of claim 15, where the actuator is an electric machine controller.

19. The vehicle system of claim 15, further comprising additional instructions to select the solution from a plurality of solutions to the Hamiltonian.

20. The vehicle system of claim 19, where the plurality of solutions to the Hamiltonian is based on a plurality of values of the first co-state and the second co-state.

* * * * *